United States Patent [19]

Blomgren et al.

[11] Patent Number: 5,608,886
[45] Date of Patent: Mar. 4, 1997

[54] BLOCK-BASED BRANCH PREDICTION USING A TARGET FINDER ARRAY STORING TARGET SUB-ADDRESSES

[75] Inventors: James S. Blomgren, San Jose; Earl T. Cohen, Fremont; Brian R. Baird, Pleasanton, all of Calif.

[73] Assignee: Exponential Technology, Inc., San Jose, Calif.

[21] Appl. No.: 298,778

[22] Filed: Aug. 31, 1994

[51] Int. Cl.$^6$ ............................. G06F 9/30; G06F 9/38
[52] U.S. Cl. ............. 395/586; 395/421.03; 395/421.04; 395/800
[58] Field of Search ...................... 395/375, 775, 395/414, 415, 421.02, 421.03, 421.04, 421.09; 364/200

[56] References Cited

U.S. PATENT DOCUMENTS

| | | | |
|---|---|---|---|
| 4,110,822 | 8/1978 | Porter et al. | 364/200 |
| 5,088,030 | 2/1992 | Yoshida | 364/275 |
| 5,093,778 | 3/1992 | Favor et al. | 395/375 |
| 5,163,140 | 11/1992 | Stiles et al. | 395/425 |
| 5,193,156 | 3/1993 | Yoshida et al. | 395/375 |
| 5,226,130 | 7/1993 | Favor et al. | 395/375 |
| 5,230,068 | 7/1993 | Van Dyke et al. | 395/375 |
| 5,276,882 | 1/1994 | Emma et al. | 395/700 |
| 5,287,467 | 2/1994 | Blaner et al. | 395/375 |
| 5,307,504 | 4/1994 | Robinson et al. | 395/800 |
| 5,327,547 | 7/1994 | Stiles et al. | 395/425 |
| 5,367,703 | 11/1994 | Levitan | 395/800 |
| 5,394,529 | 2/1995 | Brown, III et al. | 395/375 |
| 5,414,822 | 5/1995 | Saito et al. | 395/375 |
| 5,442,756 | 8/1995 | Grochowski et al. | 395/375 |
| 5,454,089 | 9/1995 | Nguyen et al. | 395/375 |
| 5,454,117 | 9/1995 | Puziol et al. | 395/800 |

OTHER PUBLICATIONS

Perleberg, Chris H. and Smith, Alan Jay, "Branch Target Buffer Design and Optimization", IEEE Transactions on Computers.

Primary Examiner—Jack B. Harvey
Assistant Examiner—Jigar Pancholi
Attorney, Agent, or Firm—Stuart T. Auvinen

[57] ABSTRACT

A target finder array in the instruction cache contains a lower portion of the target address and a block encoding indicating if the target address is within the same 2K-byte block that the branch instruction is in, or if the target address is in the next or previous 2K-byte block. The upper portion of the target address, its block number, which corresponds to the starting address of a 2K block, is generated from the target finder simply by taking the upper portion or block number of the branch instruction and incrementing and decrementing it, and using the block encoding in the finder to select either the unmodified block number of the branch instruction, or the incremented or decremented block number of the branch instruction. The lower portion of the target address that was stored in the finder is concatenated with the selected block number to get the predicted target address. The target address can be predicted in parallel with reading an instruction out of the cache, making the target available at the same time the branch instruction is available, eliminating pipeline stalls for correctly predicted branches. The initially predicted target address in the finder is generated by a quick decode of the instruction and is written when the cache is loaded from memory. The initial prediction does not have to be accurate because branch resolution logic will update the finder on each branch resolution. Register indirect branches and exceptions may also be predicted. Two instruction sets may be accommodated by different block encodings to indicate the instruction set. By using the block encoding, the finder array is small and inexpensive.

21 Claims, 6 Drawing Sheets

BLOCK-BASED BRANCH PREDICTION USING A TARGET FINDER ARRAY STORING TARGET SUB-ADDRESSES

BACKGROUND OF THE INVENTION—RELATED APPLICATION

This application is related to application for a "Dual-Instruction-Set Architecture CPU with Hidden Software Emulation Mode", filed Jan. 11, 1994, U.S. Ser. No. 08/179, 926, hereby incorporated by reference. This related application has a common inventor and is assigned to the same assignee as the present application.

BACKGROUND OF THE INVENTION—FIELD OF THE INVENTION

This invention relates to digital microprocessors, and more particularly to branch prediction.

BACKGROUND OF THE INVENTION—DESCRIPTION OF THE RELATED ART

Modern microprocessors often employ branch prediction techniques which attempt to "guess" or predict whether a conditional branch instruction will be taken, or not taken. If the branch is not taken, the next sequential instruction will be fetched. However, if the branch is taken, then instructions will have to be fetched starting from the target location, interrupting the otherwise sequential instruction fetching.

FIG. 1 shows a stream of instructions 10 to be processed. Branch instruction 12 is a conditional branch. The branch instruction 12 may depend upon a condition code or flag that was set by an earlier instruction in the instruction stream 10. An evaluation of the condition codes or flags must be made to determine if the branch instruction 12 should be taken or not taken. If the evaluation determines that the branch instruction 12 should not be taken, then sequential instruction fetching and execution continues with the next sequential instruction 14. However, if the evaluation determines that the branch instruction 12 should be taken, then a target instruction 16 is fetched and executed while the next sequential instruction 14 is not executed. Sequential instruction execution continues after target instruction 16 with instruction 18.

Since branch instructions may be frequently encountered in the instruction stream 10, a highly-optimized processor must be able to process branch instructions rapidly. Execution of a branch instruction requires that two operations be performed: the branching condition must be evaluated to determine if the branch is to be taken or not taken, and the address of the target instruction must be calculated. If the branch is not taken, the address of the target is not needed since sequential fetching will continue.

Conditional branch instructions usually depend on the values of condition codes or flags that are set by arithmetic instructions preceding the branch instruction. These flags are usually set late in the pipeline, after the ALU stage, and often in the last stage of the pipeline. The branch instruction is decoded in the decode stage of the pipeline, which is one of the earliest stages. The branch instruction is usually decoded before the preceeding instruction has set the flags.

A branch prediction scheme may be used, guessing the outcome of the conditional branch before the flags are set. The scheme may always guess not taken, or always guess taken, and be correct about 50–60% of the time. Dynamic prediction, which remembers the outcome history of the branch, can improve the prediction.

Besides the outcome, taken or not taken, the target address of the branch is also needed. Target addresses traditionally have required an additional stage of the pipeline to calculate after the branch instruction has been decoded. Unfortunately, un-assisted prediction of the target address is almost impossible since there are so many possibilities, whereas there are only two possibilities for the outcome—taken or not taken.

Branch instructions are particularly difficult to design for since processors are often pipelined, executing several instructions at once. Superscalar processors feature several pipelines, making branch design even more critical because more instructions can be in the pipelines, and the flags are set by instructions that are issued relatively closer in time to the branch instruction in the superscalar pipelines. Branch instructions may upset the normal sequential fetching and execution of instructions, requiring that instruction fetching begin again at the target. Sequential instructions in the pipeline following the branch instruction have to be purged if the branch is taken. Because branches affect fetching, which occurs in the first stage in the pipeline, branches may have to stall the pipeline until evaluated and the new target address from which to fetch is generated. Stalling the pipeline is so undesirable that many branch prediction schemes have been developed. The large number and variety of branch prediction schemes testify to the fact that no scheme is entirely satisfactory.

Prediction schemes may be expensive, storing the last target address or even the instruction at the target address. Prediction schemes may be slow, unable to resolve or evaluate the branch to determine if taken or not until late in the pipeline, requiring pipeline stalls or pipeline cancellations.

DUAL-INSTRUCTION-SET PROCESSOR

Processors, or central processing units (CPU's) that are capable of executing instructions from two separate instruction sets are highly desired at the present time. For example, a desirable processor would execute user applications for the x86 instruction set and the PowerPC™ instruction set. It would be able to execute the tremendous software base of x86 programs that run under the DOS™ and WINDOWS™ operating systems from Microsoft of Redmond, Wash., and it could run future applications for PowerPC™ processors developed by IBM, Apple, and Motorola.

Such a processor is described in the related copending application for a "Dual-Instruction-Set Architecture CPU with Hidden Software Emulation Mode", filed Jan. 11, 1994, U.S. Ser. No. 08/179,926. That dual-instruction-set CPU has a pipeline which is capable of executing instructions from either a complex instruction set computer (CISC) instruction set, such as the x86 instruction set, or from a reduced instruction set computer (RISC) instruction set, such as the PowerPC™ instruction set.

Two instruction decode units are provided so that instructions from either instruction set may be decoded. Two instruction decoders are required when the instruction sets are separate because the instruction sets each have an independent encoding of operations to opcodes. For example, both instruction sets have an ADD operation or instruction. However, the binary opcode number which encodes the ADD operation is different for the two instruction sets. In fact, the size and location of the opcode field in the instruction word is also different for the two instruction sets. In the x86 CISC instruction set, the opcode 03 hex is the ADD r,v operation or instruction for a long operand. This same opcode, 03 hex, corresponds to a completely different instruction in the PowerPC™ RISC instruction set. In CISC the 03 hex opcode is an addition operation, while in RISC the 03 hex opcode is TWI—trap word immediate, a control transfer instruction. Thus two separate decode blocks are necessary for the two separate instruction sets.

Switching from the CISC instruction set to the RISC instruction set may be accomplished by a far jump or branch instruction, while a return from interrupt can switch back to the CISC instruction set. Prediction of these branches is desirable since it is anticipated that for certain emulation strategies these switches between instruction sets will frequently be encountered.

What is desired is an inexpensive but accurate branch prediction scheme. It is also desired that the branch prediction provide both the target address and the resolution of the branch condition as early in the pipeline as possible, preferably in the fetch stage. It is also desirable to have no pipeline stalls for correctly predicted branches. The branch prediction scheme should also provide for predicting certain exceptions and software interrupts as well as branches.

The prediction scheme should further predict when a switch to the alternate instruction set will occur in a dual-instruction-set processor.

SUMMARY OF THE INVENTION

Prediction of a branch target address for a pipelined processor uses a target finder. The branch target address is a target for a branch instruction. An address of the branch instruction is within a current block, and the current block has a predetermined blocksize and starts and ends at a multiple of the predetermined blocksize. The current block is identified by a current block number.

The target finder comprises a finder entry which itself comprises a predicted target sub-address. The predicted target sub-address is an offset address within a target block. The target block has the predetermined blocksize and starts and ends at a multiple of the predetermined blocksize. The target finder also has a block encoding indicating if the target block is the current block, a previous block, or a next block. The previous block has the predetermined blocksize and starts and ends at a multiple of the predetermined blocksize, and the next block has the predetermined blocksize and starts and ends at a multiple of the predetermined blocksize.

A target generator receives the finder entry which is used for generating a predicted target address from the block encoding and the predicted target sub-address. The predicted target sub-address is an address within the target block encoded by the block encoding.

The predicted target address is rapidly generated from the predicted target sub-address and the block encoding stored in the finder entry. The target finder is inexpensive since only a sub-address rather than the full target address is stored. The target generator is fast because the addresses of the next and previous blocks can be calculated at the same time that the finder entry is being read.

According to other aspects of the invention, the target finder also includes a prediction of the outcome of the branch condition, whether the branch will be taken or not taken.

The target address and the resolution of the branch condition are provided early in the pipeline, as the branch instruction itself is being fetched. Thus no pipeline stalls are needed for correctly predicted branches. The block addresses or numbers of the current, next and previous block are calculated as the instruction cache and target finder are being read; the block encoding merely has to select the appropriate block number and concatenate it with the target sub-address to get the target address.

In still further aspects of the invention, the target finder may also include encodings for predicting exceptions and software interrupts as well as branches. These encodings may also predict when a switch to the alternate instruction set will occur in a dual-instruction-set processor. The size of the block changes from 2K bytes to 512 bytes in the alternate instruction set.

DETAILED DESCRIPTION

The present invention relates to an improvement in branch prediction. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

This application is related to copending application for a "Dual-Instruction-Set Architecture CPU with Hidden Software Emulation Mode", filed Jan. 11, 1994, U.S. Ser. No. 08/179,926, hereby incorporated by reference. Reduced instruction set computer (RISC) and complex instruction set computer (CISC) instructions may both be executed in the dual-instruction-set central processing unit (CPU).

A dual-architecture central processing unit (CPU) is capable of operating in three modes—RISC mode, CISC mode, and emulation mode. A first instruction decoder decodes instructions when the processor is in RISC mode, while a second instruction decoder decodes instructions while the processor is in CISC mode. Two instruction decoders are needed since the RISC and CISC instruction sets have an independent encoding of instructions or operations to binary opcodes.

The third mode of operation, emulation mode, also uses the first instruction decoder for RISC instructions, but emulation mode executes a superset of the RISC instruction set. Using emulation mode, individual CISC instructions may be emulated with RISC instructions. Thus, not all CISC instructions need to be directly supported in the CPU's hardware. Unsupported CISC instructions cause a jump to an emulation mode routine to emulate the unsupported CISC instruction. Upon completion of the emulation mode routine, control is returned to the CISC program with the next CISC instruction.

TARGET FINDER ARRAY IN INSTRUCTION CACHE

Figure 1:
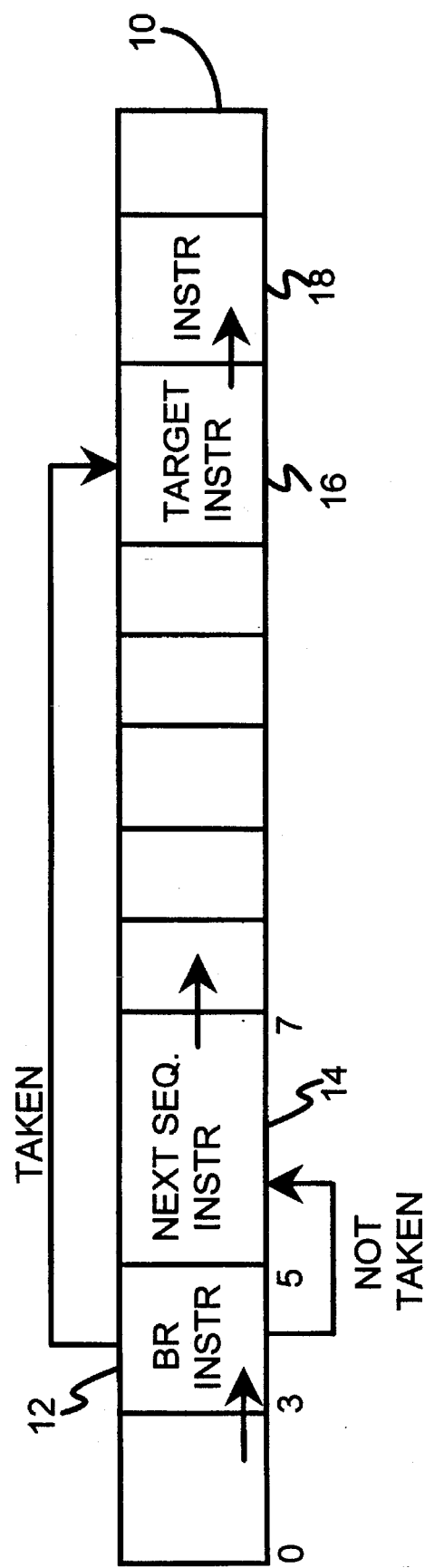
FIG. 1 is a diagram of an instruction stream containing a branch instruction.
Figure 2:
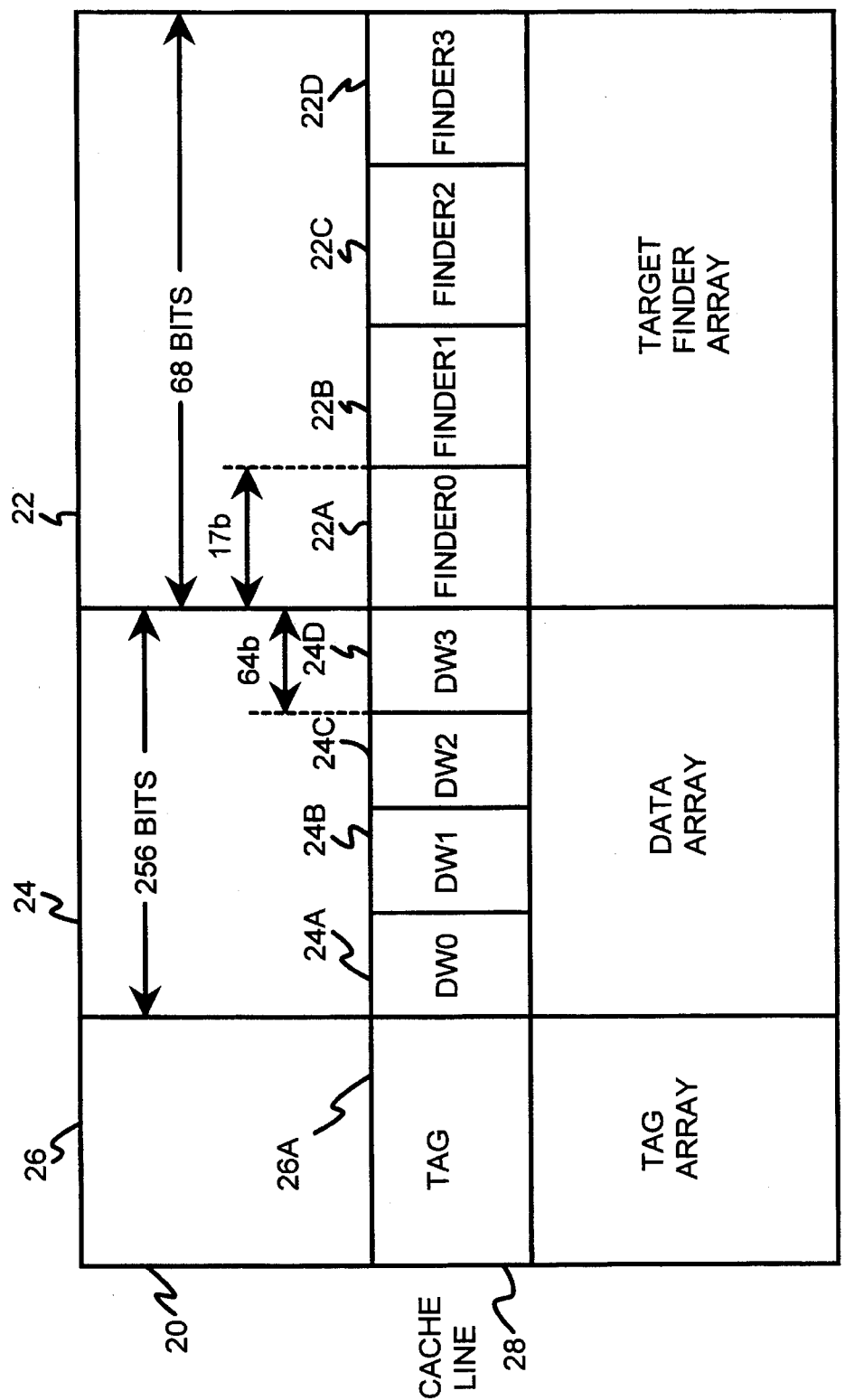
FIG. 2 is an instruction cache with a finder array for branch prediction.

FIG. 2 shows target finder array 22 employed to generate the predicted target address and predict the resolution of the branch (taken or not taken). The target finder array 22 is preferably coupled to the instruction cache 20 on the microprocessor die and in close proximity to the core of the microprocessor. Instruction cache 20 includes a tag array 26 having an index and valid bits for each line in the cache, and data array 24 which holds the instruction words themselves that are fetched into the processor's pipeline. A typical cache line 28 contains a tag 26A and four instruction double words 24A, 24B, 24C, 24D, each of which are 64 bits in size. The smallest addressable quantity in instruction cache 20 is a 64-bit double word. Each double word 24A–24D has a corresponding finder entry 22A–22D in target finder array 22. As each finder entry 22A–22D is only 17 bits in size, the cost of target finder array 22 is relatively small. However, as will be discussed in detail, finder entries 22A–22D contain enough information to generate a predicted target address very rapidly. All four of the 17-bit finder entries 22A–22D would require 68 bits, and if FIG. 2 were drawn to scale the entire target finder array 22 would occupy about the same area as a single 64-bit double word, such as 24D.

Figure 3:
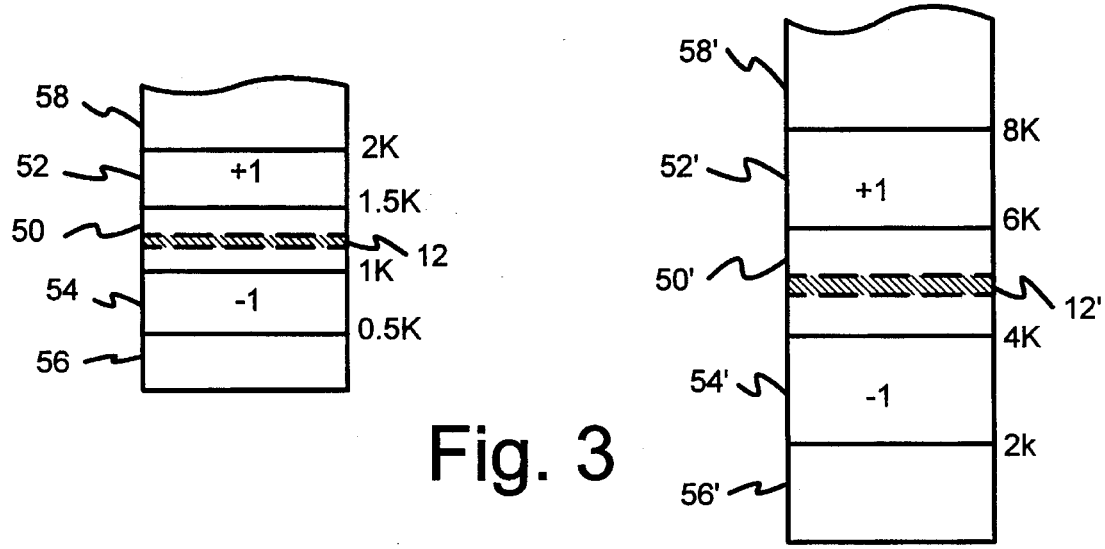
FIG. 3 is a diagram of an address space.

FIG. 3 shows an addressable instruction space. The addressable instruction space is divided into fixed-size blocks of 512 bytes each. These blocks are aligned to 512-byte boundaries. A branch instruction 12 is located in block 50. Block 52 is the next 512-byte block while block 54 is the previous 512-byte block. Blocks 56, 58 are not adjacent to the block containing branch instruction 12.

TARGET PREDICTION ONLY FOR ADJACENT BLOCKS

The inventors have recognized that most branch targets are in adjacent blocks or the same block that the branch instruction is in. Thus most of the benefit of branch prediction can be had by providing for branch prediction to adjacent blocks only. No prediction is provided to non-adjacent blocks 56, 58.

Prediction for targets anywhere in three blocks is preferable to prediction for only a single block. When the branch instruction 12 is near the boundary of block 50, for example near the lower boundary at 1024 bytes, it is likely that the branch target may be within the previous block 54 because previous block 54 is only a few bytes away. However, it is not likely to be in the non-adjacent blocks 56, 58. Using three blocks rather than just one or two makes the invention less sensitive to the alignment of the branch instruction to the boundaries of the block.

ENCODED BLOCK OF TARGET IN TARGET FINDER ENTRY

Figure 4:
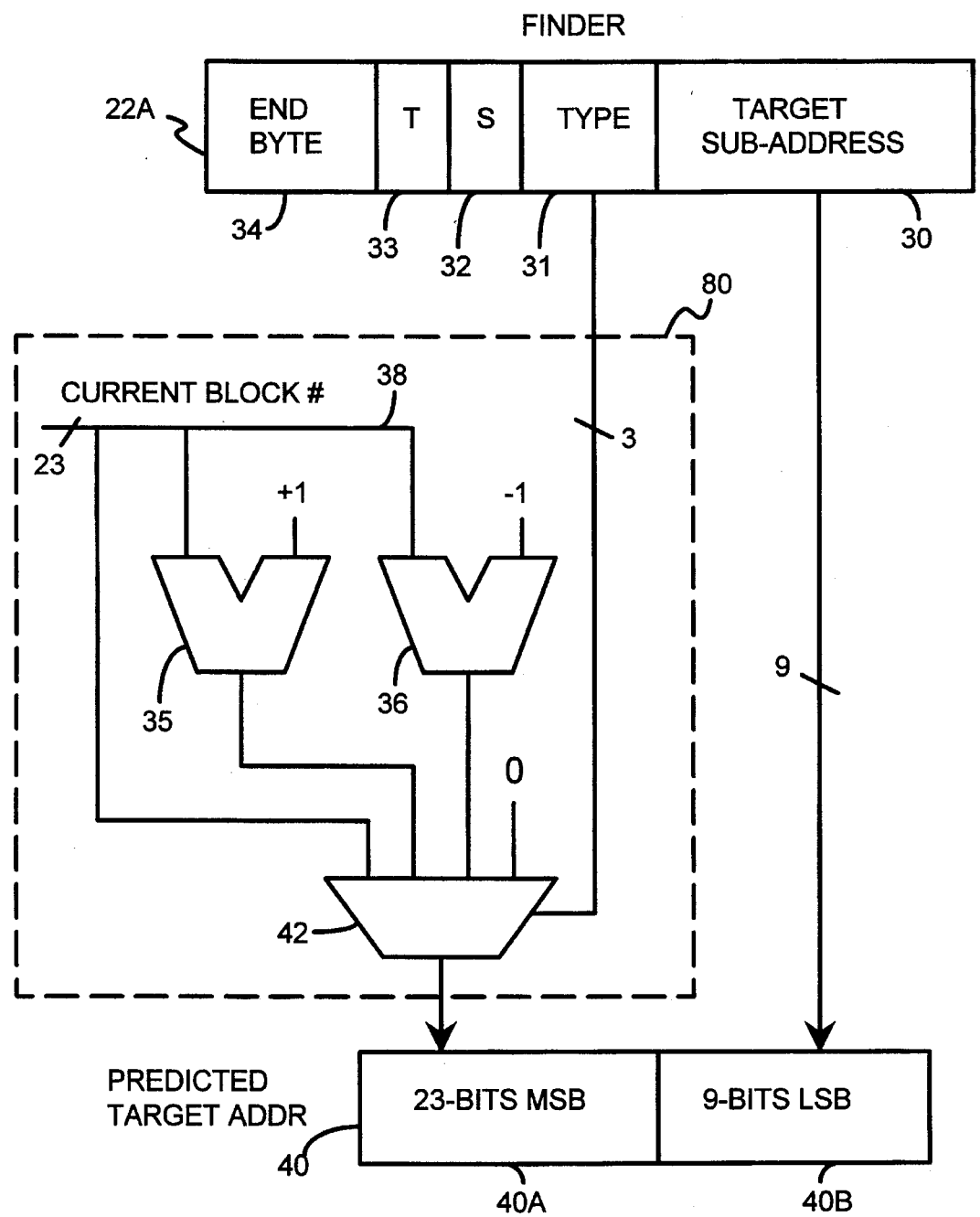
FIG. 4 is a branch prediction generator in CISC mode.

FIG. 4 shows the finder entry 22A. Finder entry 22A includes enough information to generate the predicted target address using target sub-address 30 and type field 31. The resolution of the branch, taken or not taken, is also predicted by taken bit 33 and strong bit 32. The exact location of the branch instruction within the instruction double word fetched from the cache line is also specified by end byte 34.

End byte 34 represents the last byte of the first branch instruction, the point where the instruction stream will be discontinuous if the branch is taken. Since multiple instructions can be present in one double word, it is possible to have multiple branch instructions in the single double word. Since the multiple branch instructions have to share the same finder entry, only the first taken branch instruction of the multiple branch instructions uses the finder entry. Thus no prediction is possible for any subsequent branch instruction in a double word. Allowing only one taken branch in a double word is not a serious disadvantage since it is uncommon to have several taken branches within a single double word.

Finder entry 22A contains the 9 lower or least-significant bits of the predicted target address, the target sub-address 30. Target sub-address 30 corresponds to the offset address within the 512-byte blocks of FIG. 3. The only other information needed to completely specify the predicted target address is the address of the block that the target is in. This is a 23-bit upper address for a 32-bit processor. It would be very expensive to store these 23 upper address bits for each line in the instruction cache. However, since the branch instruction is in the current block, the address of the current block, or block number, is known. The current block number is simply the upper 23 address bits of the instruction pointer, which points to the branch instruction. Since the block number is available from the instruction pointer, the only information that must be stored in finder entry 22A is an indication of the predicted target's block, which can only be the current block 50, previous block 54, or next block 52 (of FIG. 3). In the rare case that the predicted target is in a non-adjacent block 56, 58, (of FIG. 3) this is indicated as a predicted not taken branch.

Type field 31 contains an encoding indicating which block, relative to the current block, that the predicted target is in. A simple 2-bit encoding for type field 31 is:

| | |
|---|---|
| 00 | Predicted Target is in current block |
| 01 | Predicted Target is in next block |
| 10 | Predicted Target is in previous block. |

If the predicted target is in a non-adjacent block, then no prediction is possible. In that case, the taken bit 33 will be set to not taken.

PREDICTED TARGET ADDRESS GENERATION

The predicted target address is generated by the target prediction generator 80 in FIG. 4. The lower 9 bits 40B of the predicted target address 40 are simply read out of the target sub-address 30 of the finder entry 22A. The 23 upper or most-significant bits 40A of the predicted target address 40 are supplied by multiplexer or mux 42. Mux 42 is controlled by the type field 31 which is read out of the finder entry 22A. The type field 31 causes mux 42 to select the upper 23 bits of the current address 38, which is the current block number, when the type field 31 is encoded for the predicted target in the current block 50. Incrementer 35 receives these 23 upper bits of the current address 38 and increments it or adds one (+1) to yield the address of the next block 52 (of FIG. 3), the next block number. The output of incrementer 35 is selected by mux 42 when the type field 31 is encoded for the predicted target in the next block 52 (of FIG. 3). Likewise decrementer 36 receives the 23 upper bits of the current address 38 and decrements it or subtracts one (−1) to yield the address of the previous block 54 (of FIG.

3), the previous block number. The output of decrementer 36 is selected by mux 42 when the type field 31 is encoded for the predicted target in the previous block 54 (of FIG. 3).

The predicted target address generator of FIG. 4 rapidly generates the predicted target address 40 from the finder entry 22A and the current address 38. This predicted target address 40 can be generated within one processor clock cycle because the 23-bit incrementer 35 and decrementer 36 can generate their outputs from the current address 38 while the instruction cache is reading out the instruction double word and the finder entry 22A. Once the instruction cache access is complete, the type field 31 is used to quickly select either the current address or one of the outputs of the incrementer 35 and decrementer 36. Thus incrementer 35 and decrementer 36 operate in parallel with the instruction cache look-up. The small additional delay caused by mux 42 can be accounted for by using a slightly faster RAM for the target finder array 22 (of FIG. 2) or just for the type field 31. Since the target finder array 22 (of FIG. 2) is smaller in size than the data array 24 (of FIG. 2) of the instruction cache, target finder array 22 (of FIG. 2) will be faster due to its smaller size.

PREDICTION OF BRANCH RESOLUTION

Figure 5:
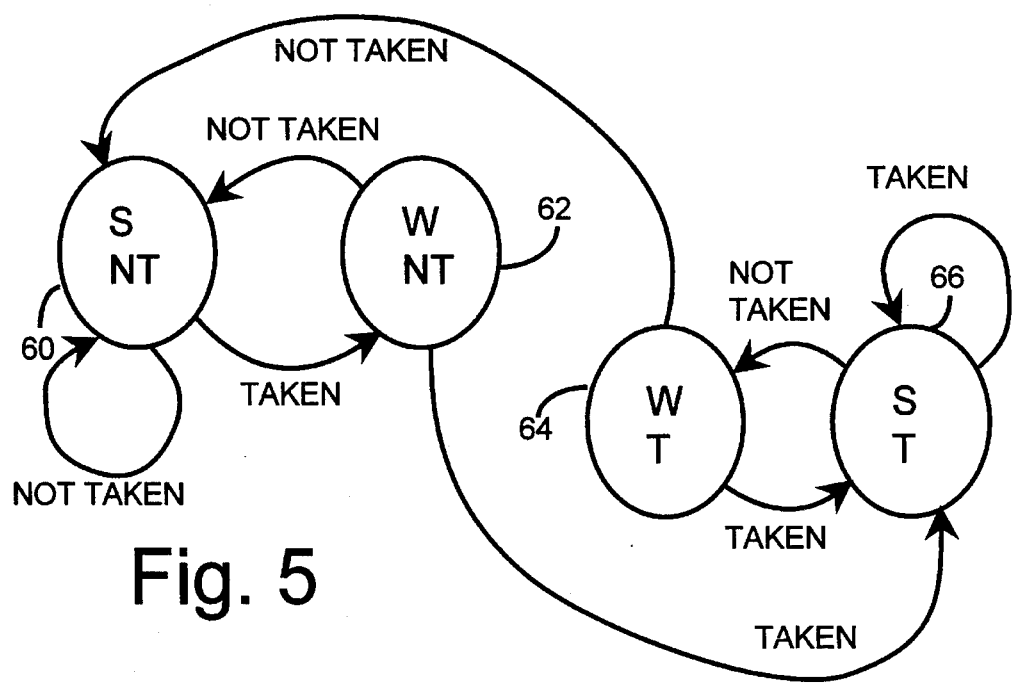
FIG. 5 is a state diagram of the taken and strong bits in the finder array.

The finder entry 22A of FIG. 4 also contains a prediction of whether the branch instruction is taken or not taken. Taken bit 33 indicates if the prediction is for a taken or not taken branch. Strong bit 32 is used in conjunction with taken bit 33 to improve the accuracy of the prediction. FIG. 5 shows a state diagram for the prediction algorithm used. Strong bit 32 can take on the values of strong "S" or weak "W", while taken bit 33 can have the values of taken "T" or not taken "NT". These bits 32, 33 refer to the prediction for the next time the branch instruction is encountered by the instruction fetcher and are updated each time the branch instruction is resolved by the pipeline. Initially the prediction is set to the weak, taken state 64. If the branch is not taken, then bits 32, 33 are changed to strong, not taken and state 60 is entered. Otherwise, if the branch is correctly predicted taken, then bit 32 is updated to strong and state 66 is entered. If the branch is next resolved actually taken, then state 66 continues and no changes to bits 32, 33 are needed. If the branch is resolved not taken, then the prediction was wrong and the strong bit 32 is changed to weak and state weak, taken 64 is entered. A second mis-predict or not taken branch resolution would cause both bits 32, 33 to change to strong, not taken state 60. However, a resolved taken branch would return to strong, taken state 66.

A not taken resolution from strong, not taken state 60 would remain in that state. A mis-prediction would cause the strong bit 32 to change to weak, but the prediction for not taken is kept, entering the weak, not taken state 62. A correct prediction of not taken from weak, not taken state 62 would return to strong, not taken state 60 with an update of strong bit 32. A second mis-predict would cause both bits 32, 33 to change to strong, taken state 66.

Thus the taken bit 33 cooperates with the strong bit 32 to provide a prediction algorithm that allows for two mis-predictions before changing the expected resolution, taken bit 33. This is a valuable algorithm for program loops. When the loop is exited, the state will change from strong, taken to weak, taken. The next time the loop is entered, the prediction will be taken, a correct prediction. Thus only one mis-prediction would occur for each time the loop is executed; a mis-prediction when the loop is exited.

DUAL-ARCHITECTURE ENCODING OF TYPES

The invention may be expanded to allow for multiple architectures. In the CISC architecture, instructions can begin and end on any byte boundary. Thus a CISC target instruction could begin on any of bytes 0,1,2,3,4,5,6, or 7. This requires that the least-significant bit of target sub-address 30 (of FIG. 4) specify the 8-bit byte. For CISC instructions, the target sub-address 30 (of FIG. 4) corresponds to $2^9(=512)$ bytes.

However, in the RISC architecture, instructions are always aligned to word boundaries; they must always begin at byte 0 or 4 of the 8-byte double word and end with byte 3 or 7. The target sub-address 30 of FIG. 4 is a word sub-address, meaning that the least-significant bit selects between the first and second 32-bit word in a double word, not as for CISC. Nine bits of target sub-address 30 corresponds to $2^9(=512)$ 32-bit words, or 2K bytes. Thus in RISC mode the size of the block is 2K bytes, not 512 bytes as for CISC mode. FIG. 3 shows that while CISC mode has 512-byte blocks such as current block 50, RISC mode has 2K-byte blocks such as current block 50'. The range of addresses that can be predicted for the target is limited to three blocks, which is 3×2K bytes=6K bytes for RISC mode, but only 3×512 bytes=1.5K bytes for CISC mode.

The difference in block sizes between the two architectures causes the target sub-address 30 to have slightly different meanings depending upon the architecture. Since the dual-instruction-set CPU can execute instructions from both architectures simultaneously, the target finder array 22 may contain targets from both RISC and CISC branch instructions. The architecture of the branch instruction must therefore be encoded into the target finder array. Type field 31 can be expanded to include an encoding for the instruction set. Such an encoding is shown below:

| | |
|---|---|
| 000 | CISC Mode Predicted Target is in current block |
| 000 | CISC Mode Predicted Target is in next block |
| 010 | CISC Mode Predicted Target is in previous block |
| 100 | RISC Mode Predicted Target is in current block |
| 101 | RISC Mode Predicted Target is in next block |
| 110 | RISC Mode Predicted Target is in previous block. |

Figure 4A:
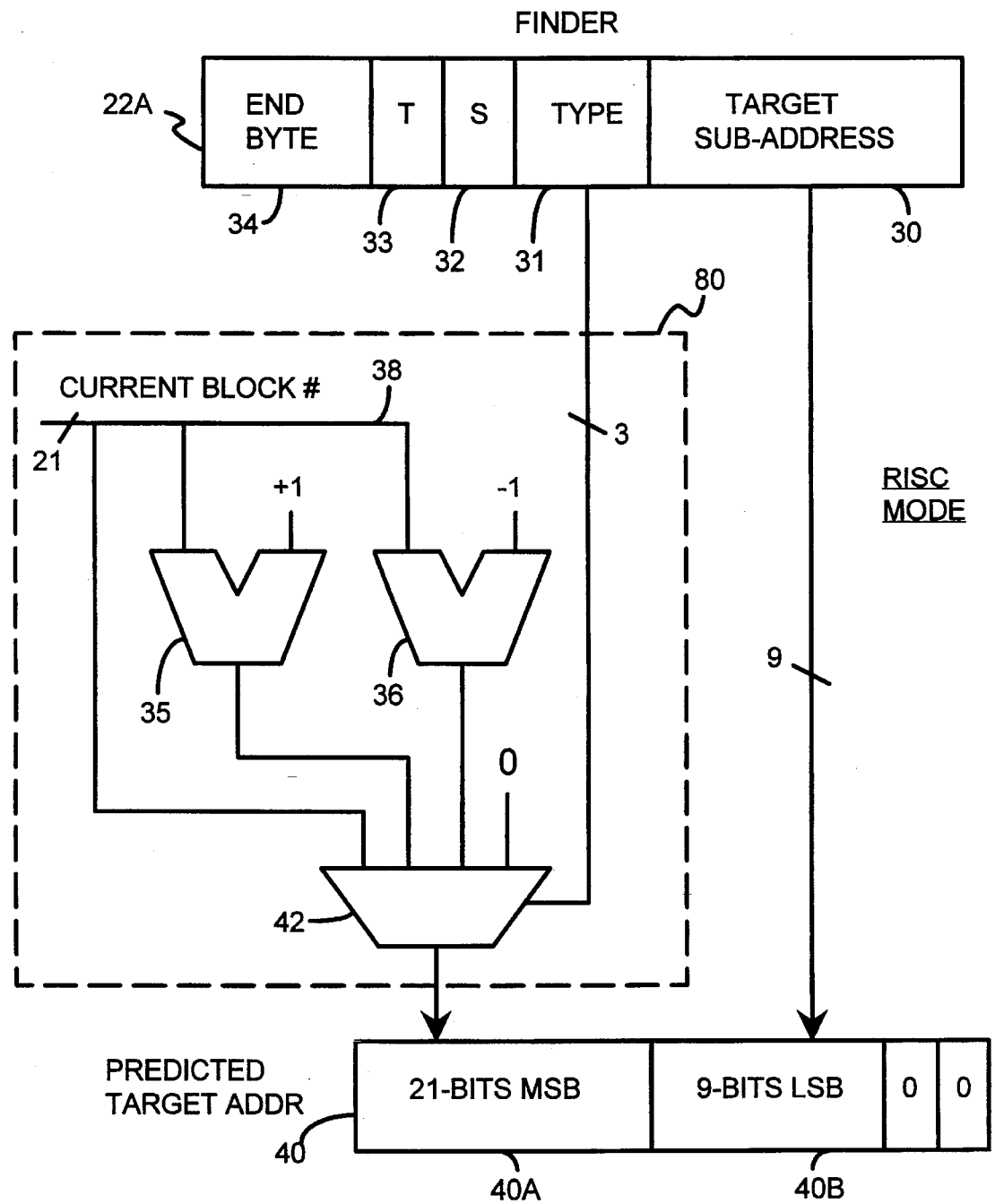
FIG. 4A is a branch prediction generator in RISC mode.

FIG. 4A shows the branch prediction generator of FIG. 4 operating in RISC mode. Reference numerals are the same in FIGS. 4 and 4A to indicate similar or identical elements. FIGS. 4 and 4A show the same apparatus operating in two modes: FIG. 4 for CISC mode, and FIG. 4A for RISC mode. Since the lower two bits encoded by type field 31 are identical for CISC mode and RISC mode, the control of mux 42 is the same for both modes. However, the predicted target address 40 is a byte address for CISC mode but a word address for RISC mode. The predicted target address 40 must be partially shifted to the left by two bits and have two zeros appended to the right LSB's to convert the CISC byte address to a RISC word address. Additionally, for RISC mode, only the upper 21 bits of current address 38 are input to incrementer 35, decrementer 36 and mux 42. Thus for CISC mode the upper 23 bits of current address 38 generate bits 9 to 31, but for RISC mode the upper 21 bits of current address 38 generate bits 11 to 31. The type field 31 can signal to control logic (not shown) to use the upper 21 bits of current address 38 and the shifted 9 bits of predicted target address 40B when a RISC mode target is predicted. Such control and shifting logic is well-known by persons of skill in the art and is therefore not discussed further.

The last byte of the branch instruction, the end byte 34, is included in the finder entry 22A to provide architecture independence yet still indicate the location of the branch instruction in the instruction double word. The PowerPC™ RISC architecture defines the origin of a branch as the address of the branch instruction, while the x86 CISC architecture defines as the branch origin the first byte following the branch instruction, the first byte of the next sequential instruction. In either architecture the target address is calculated as a displacement added to the branch origin. Thus for PowerPC™ the target address is the branch instruction address+displacement, while for x86 the target address is the address of the sequential instruction following the branch+displacement. Using the end byte allows the finder and target address generation hardware to be independent of the instruction set being executed, simplifying the design.

PREDICTION OF EXCEPTIONS AND INSTRUCTION-SET SWITCHING

Simple jumps and calls are not the only branch instructions that can be predicted with the invention. Software interrupts or exceptions that occur regularly may also be predicted. Exceptions cause the state of the processor to change, requiring that certain state information be saved on the stack or in registers. This state information may include the current instruction pointer and the flags or condition code register. The privilege level may change from user to supervisor. Because of these additional functions that occur when an exception occurs, exception branching is not normally predicted. However, an additional type in type field 31 (of FIG. 4) can be encoded indicating that the prediction is for an exception rather than a simple branch. Encoding 111 may be used for this purpose.

Upon decoding this 111 type, the branch prediction generator will generate the predicted target address in a modified manner. An absolute target is used for exceptions, rather than a target calculated by adding a displacement to the address of the branch instruction. This absolute target address, which is a trap or interrupt vector number or entry point, is stored in the target finder array where the target sub-address would be stored. The absolute target can be anywhere in the address space. It is not limited to the current or adjacent blocks. Since these absolute addresses are usually an address into a table, such as an interrupt table stored near address zero, the upper address bits of the absolute target are usually all zeros. Thus the 9 bits in the target sub-address field is sufficient to identify these absolute targets. The entry points in these tables are preferably at discrete 32-byte intervals, so the 9-bit absolute address from the target sub-address field 30 is shifted up by 5 bits before being loaded as the predicted target address 40 (of FIG. 4).

Since the type field is encoded as 111, mux 42 of FIG. 4 will select the fourth input, which is the value zero, "0". This places zeros in the upper bits of the predicted target address 40. Thus, by storing a portion of an absolute target address in the target sub-address field of the finder 22A, a target address for exceptions or emulation entry may be predicted. The absolute target is not relative to the current address, so the incrementer 25 and decrementer 36 are not needed. Instead the mux places zeros in the upper bit-positions, and the portion of the absolute target stored in the finder array is shifted up by 5 bits.

A special type of exception is a switch to the alternate instruction set. This exception may also be provided for in the 111 type encoding, or an instruction set swap bit may be added to the finder entry 22A. Entry points into emulation mode that cause the instruction set being processed to switch may thus also be predicted using the present invention. Emulation mode will be entered each time a complex CISC instruction that is not executed directly is encountered, and so prediction should be accurate as well as useful.

REGISTER INDIRECT TARGET PREDICTION

Most branch instructions add either a displacement or immediate value to the current instruction pointer value to get the target address. Since this immediate value is part of the instruction word, and does not vary over time, the target address will not vary over time. However, some branch instructions use a value stored in a register as the target address. Register indirect branching which uses a value in a register is difficult to predict since the value in the register is not fixed but can change over time as new values are loaded into the register.

The PowerPC™ RISC architecture includes a link register that a branch-to-link instruction reads to calculate the target address. A return-from-interrupt (rfi) instruction reads a value saved in a save/restore register (SRR0) to get the target address. Both the link register and the save/restore register can have variable values resulting in variable target addresses being generated.

The invention can be extended to account for register indirect branching, such as with the link register. Type 011 is defined for register indirect branches. Alternately, additional bits in the type field 31 may be defined to allow for encoding of these additional types. When the type field 31 indicates a register indirect branch, the normal target prediction mechanism is not used. The branch taken/not taken mechanism is still used. Since the value in the link register can change, it is not useful to store a predicted target address in the target finder array 22 (of FIG. 2). Instead, if the branch is predicted taken, the pipeline is stalled until the link register is stable. The pipeline control logic may have look-ahead logic to determine if any instructions in the pipeline will write to the link register, or the pipeline may be blindly stalled until all instructions have had the chance to write to the link register. Pipeline control logic will signal to the instruction fetcher at the earliest opportunity that the link register is stable. Instruction fetching will then continue from this new target address. If the indirect branch is predicted not taken, then the pipeline is not stalled. Optimized code will set the new value in the register sufficiently ahead of the branch instruction to avoid pipeline stalls.

WRITING TO FINDER ARRAY

The finder array is written to both when the instruction cache is filled with a new line, and when a branch is resolved. Thus the finder array can predict a taken branch for the first time a branch instruction is encountered. The finder can be corrected once the branch is encountered and resolved, improving the accuracy of the prediction.

Figure 6:
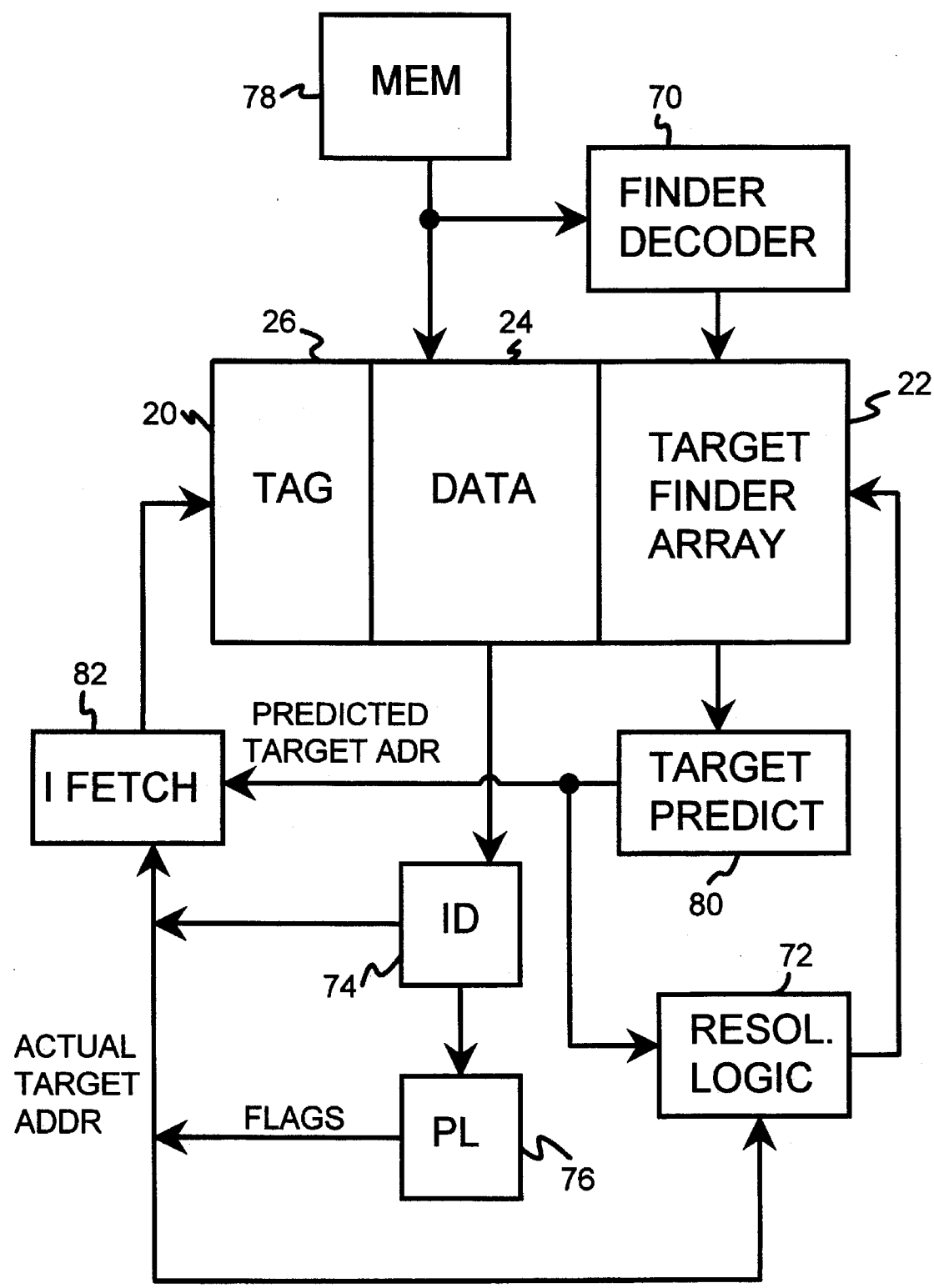
FIG. 6 is a diagram of a processor using the target finder array of the present invention.

FIG. 6 is a diagram of a processor using the target finder array of the present invention. Instruction cache 20 receives instruction double words from a memory 78, which may be a main memory or preferably a secondary cache. A tag portion of an address and valid bits are loaded into tag array 26, while the instruction double words are loaded into data array 24. A finder decoder 70 performs a quick decoding on the instruction double word being loaded into instruction cache 20 and produces the information to write into target finder array 22. Finder decoder 70 quickly decodes all bytes in the instruction double word to determine if any branch instructions are present in the double word. If no branches are detected, the taken bit 33 (of FIG. 4) is cleared to zero and written into target finder array 22 so that no branch will be predicted.

Finder decoder 70 determines if an opcode is present for a branch instruction. For RISC instruction sets, the instructions are aligned on the word boundary, and the opcodes appear in a fixed byte within the instruction. Thus the finder decoder need only decode these bytes where the opcodes are located. If a branch is detected, the taken bit 33 (of FIG. 4) is set and the strong bit 32 (of FIG. 4) is cleared and written to the target finder array 22. Additionally, an immediate displacement may be indicated by the opcode, which may be added to the address of the fetched branch instruction to get the predicted target address. The lower bits of this predicted target address are written to target sub-address 30 (of FIG. 4) in the target finder array, while the upper bits are examined to determine if the predicted target address is within the current block 50 (of FIG. 3), the next block 52 (of FIG. 3), or the previous block 54 (of FIG. 3), and the corresponding encoding is written to type field 31 of the target finder array 22 for the cache line being loaded. If the predicted target address is not within the current or adjacent blocks 50, 52, 54 (of FIG. 4), then the type encoded is irrelevant, since the taken bit 33 (of FIG. 4) is set to not taken.

The end byte of the instruction is also determined by finder decoder 70, so that all fields of finder entry 22A (of FIG. 4) may be written. Preferably finder decoder writes the finder entry 22A (of FIG. 4) at the same time as the instruction double word is being loaded into instruction cache 20. Thus the finder array is loaded with a branch prediction and a predicted target address when an instruction word is loaded into the instruction cache 20. This allows a prediction of weakly taken for the first time a branch instruction is encountered, which is desirable since branches are usually taken the first time encountered. Many prior-art systems require that the branch instruction be processed by the processor's pipeline before a target prediction can be made. Newer architectures may support static branch prediction encoded into the branch instruction itself which may be used as an initial prediction for the taken bit. The initial prediction may be set to weakly not taken for older complex architectures due to the complexity of generating an initial prediction.

Target prediction generator 80, using the apparatus of FIG. 4, reads the target finder array 22 when an instruction is read out of instruction cache 20. A predicted target address is available to the instruction fetcher 82 at the same time that the instruction is read out of instruction cache 20 to instruction decode stage 74. This timing allows instruction fetcher 82 to immediately switch to fetching from the predicted target address if the branch is predicted taken by taken bit 33 (of FIG. 4).

Instruction cache 20 supplies instructions to the instruction decode stage 74, which supplies decoded instructions to the pipeline 76. Resolution logic 72 determines if a branch instruction was take or not by evaluating flags or condition codes set by other instructions in pipeline 76. Resolution logic 72 must wait until all instructions that can update the flags or condition codes have determined their flags before evaluating the branch instruction. Flags can be bypassed to the resolution logic 72 to reduce the delay. Resolution logic 72 also receives the actual target of the branch instruction which is calculated by either the pipeline 76 or the instruction decoder stage 74. Resolution logic 72 verifies that the predicted target address matched the actual target address. If not, then a mis-predict operation must be performed, rather than a simple update of the taken and strong bits. The actual target is also sent to instruction fetcher 82 if the branch was mis-predicted so that the correct instruction fetching can begin.

Resolution logic 72 updates the finder entry 22A (of FIG. 4) in the cache line corresponding to the branch instruction that was just resolved. It writes the low bits of the actual target address to the target sub-address 30 (of FIG. 4) and determines which block the target address is in and encodes this to write the type field 31 (of FIG. 4). The instruction set and type of branch is also encoded into type field 31 (of FIG. 4). The taken bit 33 (of FIG. 4) and strong bit 32 (of FIG. 4) are also updated in accordance with the state diagram of FIG. 5, and the actual end byte of the branch instruction is written to end byte 34 (of FIG. 4). Often the same information will be written back into the finder entry 22A (of FIG. 4), as when the branch is correctly predicted after the first correct prediction.

The target finder array 22 is written by both the finder decoder 70 when the instruction cache 20 is being loaded by memory 78, or when a branch is resolved in the processor's pipeline 76 by resolution logic 72. Thus two separate sources may write the target finder array 22. If the two sources try to write simultaneously, then the finder must be dual-ported or one of the sources must wait.

FAULT-TOLERANT FINDER ARRAY

Finder decoder 70 does not have to be perfectly accurate since a bad value in the target finder array can be corrected and updated by resolution logic 72. A preferred embodiment has finder decoder 70 predict most RISC branches but no CISC branches. CISC branches can still be predicted, but the first time a CISC branch is encountered it will be mis-predicted and its finder entry updated with the actual target generated by the pipeline 76 or instruction decode stage 74 if the branch is determined to be taken.

Some of the lines in the target finder array 22 may become stale as a new cache line is fetched, overwriting the old finder. If the old finder has a branch instruction in the pipeline, the resolution logic 72 will just blindly overwrite the new finder with the old finder. Hard defects or soft errors such as alpha-particle hits can be tolerated because resolution logic 72 will write a correct value for the target, type, and end byte once the branch instruction is executed by the pipeline 76 and resolved.

The resolution logic 72 may detect that the finder entry 22A (of FIG. 4) is bad for a number of reasons. The branch may have been predicted taken, when it was actually not taken, or vice versa. The branch could have been predicted correctly as taken, but the target address in the finder is incorrect. Either the target sub-address is incorrect, the block encoding for current or adjacent blocks is wrong, or the branch is not actually within the current or adjacent blocks. The end byte field 34 (of FIG. 4) may not match the last byte of the actual branch instruction. It is even possible that the finder predicted a taken branch, but the instruction was not a branch instruction at all

CONCLUSION

The target finder array contains a target sub-address rather than the full target address. A block encoding specifies if the target is in the same aligned 2K-byte block as the branch instruction, or in the next or previous aligned 2K-byte block. This provides an inexpensive but accurate branch prediction scheme. The target finder also includes a prediction of the outcome of the branch condition, whether the branch will be taken or not taken. The target address and the resolution of the branch condition are provided early in the pipeline, as the branch instruction itself is being fetched. Thus no pipeline stalls are needed for correctly predicted branches. The block addresses or numbers of the current, next and previous block are calculated as the instruction cache and target finder are being read; the block encoding merely has to select the appropriate block number and concatenate it with the target sub-address to get the target address.

The target finder may also include encodings for predicting exceptions and software interrupts as well as branches. These encodings may also predict when a switch to the alternate instruction set will occur in a dual-instruction-set processor. The size of the block preferably changes from 2K bytes to 512 bytes based on the branch granularity in the alternate instruction set.

ALTERNATE EMBODIMENTS

Several other embodiments are contemplated by the inventors. For example the relative cost of target finder array 22 of FIG. 2 could be reduced further by having only one or two finder entries 22A for all four double words 24A–24D. This would limit prediction to only one branch instruction for four double words, or about eight RISC instructions. The preferred embodiment has one finder entry and one prediction for one double word or two RISC instructions. Other embodiments could provide one finder for every instruction word, but at a higher cost. This is an area vs. performance design tradeoff. The expected density of branch instructions is traded off against the hardware cost for the target finder array 22. The inventors have expected one branch instruction for every five to six instructions but have designed the target finder array 22 for one branch instruction for every two instructions because of the high performance cost of branch pipeline stalls when prediction hardware is insufficient. Another alternate embodiment is to only have one source write to the finder array at any time, but this decreases accuracy and performance.

A 17-bit finder entry has been described as the preferred embodiment. Having additional bits for the target sub-address would allow for a larger block size, allowing more branches to be predicted. Likewise fewer bits in the target sub-address would reduce the blocksize and range of target addresses that can be predicted. Additional adders could allow for more than three blocks for the target, along with more type bits to encode these additional blocks. The strong bit is not critical for prediction, but improves the accuracy of the taken bit's prediction. Additional bits could be used to further improve the accuracy of prediction. Thus the exact size of the finder entry may vary.

The cache may be implemented in various ways, such as direct-mapped or set-associative, and it may store only instructions or both instructions and data (a combined cache). The size of the tag array, data array, and finder array are variable, as is the number of lines in the cache and the number of instruction words stored on each line. The finder array may be implemented as a physical part of the cache, or it may be separate from the cache.

Finder decoder 70 of FIG. 6 may only decode RISC instructions, or it may also decode the more complex CISC instructions, or only some of the simpler CISC instructions. Finder decoder 70 does not have to be perfectly accurate since a bad value in the target finder array can be corrected and updated by resolution logic 72. A preferred embodiment has finder decoder 70 predict most RISC branches but no CISC branches. CISC branches can still be predicted, but the first time a CISC branch is encountered it will be mispredicted if it is actually taken, and its finder entry will be updated with the actual target generated by the pipeline 76 or instruction decode stage 74.

This improvement relates to a central processing unit (CPU) for a dual-instruction set architecture. While the detailed description describes the invention in the context of the PowerPC™ reduced instruction set computer (RISC) and the x86 complex instruction set computer (CISC), it is contemplated that the invention applies to other instruction sets besides PowerPC™ RISC and x86 CISC, and to more than two instruction sets, without departing from the spirit of the invention. The exact number of bits in each register may likewise be varied by persons skilled in the art without departing from the spirit of the invention.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A target finder for predicting a branch target address for a pipelined processor, the branch target address being a target for a branch instruction, an address of the branch instruction being within a current block, the current block having a predetermined blocksize and starting and ending at a multiple of the predetermined blocksize, the current block being identified by a current block number, the target finder comprising:

a finder entry which comprises:

a predicted target sub-address, the predicted target sub-address being an address within a target block, the target block having the predetermined blocksize and starting and ending at a multiple of the predetermined blocksize;

a block encoding indicating if the target block is the current block, a previous block, or a next block, the previous block having the predetermined blocksize and starting and ending at a multiple of the predetermined blocksize, the next block having the predetermined blocksize and starting and ending at a multiple of the predetermined blocksize; and a target generator, receiving the finder entry, for generating a predicted target address from the block encoding and the predicted target sub-address, the predicted target sub-address being an address within the target block encoded by the block encoding, whereby the predicted target address is generated from the predicted target sub-address and the block encoding stored in the finder entry.

2. The target finder of claim 1 wherein the target generator comprises:

means for forming a next block number of the next block and a previous block number of the previous block from the current block number;

multiplexing means for selecting as an outputted block number the current block number if the block encoding indicates that the target block is the current block, the multiplexing means selecting as the outputted block number the next block number if the block encoding indicates that the target block is the next block, the multiplexing means selecting as the outputted block number the previous block number if the block encoding indicates that the target block is the previous block; and means for generating a predicted target address from the outputted block number and the predicted target sub-address, the predicted target sub-address being an address within a block having the outputted block number, whereby the predicted target address is generated from the predicted target sub-address and the block encoding stored in the finder entry.

3. The target finder of claim 2 wherein the previous block ends at the start of the current block and the next block starts at the end of the current block, and wherein the means for forming comprises an incrementer for incrementing the current block number to generate the next block number of the next block, the means for forming further comprising a decrementer for decrementing the current block number to generate the previous block number of the previous block.

4. The target finder of claim 1 further predicting an outcome of the branch instruction, the finder entry further comprising:

an outcome prediction of the branch instruction, the outcome prediction indicating if the branch instruction is predicted to be taken or not taken, the pipelined processor fetching a target instruction at the predicted target address if the outcome prediction is to be taken, the pipelined processor fetching a sequential instruction if the outcome prediction is not taken, the sequential instruction immediately following the branch instruction, whereby the target instruction is fetched if the outcome prediction is to be taken, while the sequential instruction is fetched if the outcome prediction is not taken.

5. The target finder of claim 2 wherein the next block number and the previous block number are formed by the target generator while the branch instruction is being read out of a cache and the predicted target sub-address and the block encoding are being read out of the target finder, whereby the branch instruction and the predicted target address are available at substantially the same time.

6. The target finder of claim 2 wherein the next block number and the previous block number are formed by the target generator while the branch instruction is being read out of a cache and the predicted target sub-address and the block encoding are being read out of the target finder during the same processor clock period, whereby the branch instruction and the predicted target address are available during the same processor clock period.

7. The target finder of claim 6 further comprising:

resolving means for updating the target finder entry when the branch instruction is resolved by the pipelined processor, the resolving means updating the predicted target sub-address with a sub-address portion of an actual target address generated by execution of the branch instruction by the pipelined processor, and updating the block encoding with an indication of an address of an actual block, the sub-address portion being an address within the actual block, whereby the target finder entry is fault-tolerant, being updated when the branch instruction is executed by the pipelined processor.

8. The target finder of claim 1 wherein the finder entry is in a target finder array, the target finder array comprising a plurality of finder entries, and wherein a cache comprises a plurality of cache lines, each cache line having at least one corresponding finder entry.

9. The target finder of claim 8 wherein each cache line comprises a plurality of instructions, and wherein each cache line has a corresponding finder entry.

10. The target finder of claim 8 wherein the corresponding finder entry is loaded with the predicted target sub-address and the block encoding when each cache line is loaded with an instruction.

11. The target finder of claim 10 further comprising finder decode means, receiving the instruction when the instruction is being loaded into a cache line, for partially decoding the instruction to determine if the instruction is a branch instruction, the finder decode means calculating the predicted target sub-address and the block encoding, the finder decode means loading the predicted target sub-address and the block encoding into the finder entry when the cache line is loaded with the instruction, whereby the finder entry is initialized with a predicted target address when the instruction is loaded into the cache.

12. The target finder of claim 8 wherein the finder entry further comprises an end byte identifier, the end byte identifier indicating a location within a cache line of a last byte in the branch instruction.

13. The target finder of claim 1 wherein the finder entry further comprises:

register indirect indicating means for indicating that the branch instruction is a register indirect branch instruction, wherein the target address is a value stored in a register, the register indirect indicating means disabling the target generator and signaling the pipelined processor to fetch the value stored in the register, whereby the finder entry includes prediction for register indirect branches.

14. The target finder of claim 1 wherein the finder entry further comprises:

exception indicating means for indicating that the branch instruction is an exception branch instruction, wherein the predicted target sub-address is a portion of an absolute address, the exception indicating means disabling the target generator and signaling the pipelined processor to store state information, the pipelined processor using the portion of an absolute address to generate the target address, whereby the finder entry includes prediction for exception branches.

15. The target finder of claim 1 wherein the finder entry further comprises:

instruction set indicating means for indicating if the branch instruction belongs to a first instruction set, the first instruction set having a first encoding of operations to opcodes, the instruction set indicating means for indicating if the branch instruction belongs to a second instruction set, the second instruction set having a second encoding of operations to opcodes, the first encoding of operations to opcodes being independent from the second encoding of operations to opcodes, whereby the finder entry includes prediction for the instruction set of the branch instruction.

16. The target finder of claim 1 wherein the finder entry further comprises:

emulation entry indicating means for indicating if the branch instruction is an emulation entry instruction, the emulation entry instruction causing the pipelined processor to enter emulation mode, whereby the finder entry includes prediction for emulation-mode-entry branch instructions.

17. A method for predicting a branch target address for a pipelined processor, the method comprising:

loading a cache with a branch instruction, an address of the branch instruction being within a current block, the current block having a predetermined blocksize and starting and ending at a multiple of the predetermined blocksize, the current block having a current block number;

loading a target finder entry with a predicted target sub-address, the predicted target sub-address being an offset address within a target block, the target block having the predetermined blocksize and starting and ending at a multiple of the predetermined blocksize;

loading the target finder entry with a block encoding indicating if the target block is the current block, a previous block, or a next block, the previous block having the predetermined blocksize and starting and ending at a multiple of the predetermined blocksize, the next block having the predetermined blocksize and starting and ending at a multiple of the predetermined blocksize;

reading the branch instruction out of the cache and the predicted target sub-address and the block encoding out of the target finder entry;

forming a next block number of the next block and a previous block number of the previous block from the current block number;

selecting as an outputted block number the current block number if the block encoding indicates that the target block is the current block, selecting as the outputted block number the next block number if the block encoding indicates that the target block is the next block; selecting as the outputted block number the previous block number if the block encoding indicates that the target block is the previous block; and generating a predicted target address from the outputted block number and the predicted target sub-address, the predicted target sub-address being an address within a block having the outputted block number, whereby the predicted target address is generated from the predicted target sub-address and the block encoding stored in the target finder entry.

18. The method of claim 17 wherein the previous block ends at the start of the current block and the next block starts at the end of the current block.

19. The method of claim 18 further predicting an outcome of the branch instruction, the method further comprising the steps of:

loading the target finder entry with an outcome prediction of the branch instruction, the outcome prediction indicating if the branch instruction is predicted to be taken or not taken;

fetching a target instruction at the predicted target address if the outcome prediction is to be taken; and fetching a sequential instruction if the outcome prediction is not taken, the sequential instruction immediately following the branch instruction, whereby the target instruction is fetched if the outcome prediction is to be taken, while the sequential instruction is fetched if the outcome prediction is not taken.

20. The method of claim 18 wherein the next block number and the previous block number are formed while the branch instruction is being read out of the cache and the predicted target sub-address and the block encoding are being read out of the target finder entry during the same processor clock period, whereby the branch instruction and the predicted target address are available during the same processor clock period.

21. The method of claim 18 further comprising the step of:

updating the target finder entry when the branch instruction is resolved by the pipelined processor, updating the predicted target sub-address with a sub-address portion of an actual target address generated by execution of the branch instruction by the pipelined processor, and updating the block encoding with an indication of an address of an actual block, the sub-address portion being an address within the actual block, whereby the target finder entry is fault-tolerant, being updated when the branch instruction is executed by the pipelined processor.

* * * * *